us009825888B2

(12) United States Patent
Bank et al.

(10) Patent No.: US 9,825,888 B2
(45) Date of Patent: Nov. 21, 2017

(54) EXPERT AVAILABILITY IDENTIFICATION

(71) Applicant: International Business Machines Corporation, Armonk, NY (US)

(72) Inventors: Judith H. Bank, Morrisville, NC (US); Liam Harpur, Skerries (IE); Ruthie D. Lyle, Durham, NC (US); Patrick J. O'Sullivan, Ballsbridge, IL (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/014,612

(22) Filed: Aug. 30, 2013

(65) Prior Publication Data

US 2014/0164537 A1 Jun. 12, 2014

Related U.S. Application Data

(63) Continuation of application No. 13/707,960, filed on Dec. 7, 2012, now Pat. No. 9,300,606.

(51) Int. Cl.
*G06F 15/16* (2006.01)
*H04L 12/58* (2006.01)

(52) U.S. Cl.
CPC .............. *H04L 51/04* (2013.01); *H04L 51/32* (2013.01)

(58) Field of Classification Search
USPC ......... 709/220; 455/466; 704/10, 8; 717/146
See application file for complete search history.

(56) References Cited

U.S. PATENT DOCUMENTS

| 6,196,846 | B1* | 3/2001 | Berger et al. ................ 434/118 |
| 6,429,808 | B1* | 8/2002 | King et al. ................ 342/357.44 |
| 6,449,355 | B1 | 9/2002 | Gutman |
| 6,530,039 | B1* | 3/2003 | Yang ................... G06F 11/3696 704/10 |
| 6,633,742 | B1 | 10/2003 | Turner et al. |
| 6,708,137 | B2* | 3/2004 | Carley ................ H04L 41/142 702/179 |
| 6,912,563 | B1* | 6/2005 | Parker ................... G06Q 30/02 709/204 |
| 7,499,995 | B2* | 3/2009 | Armstrong .................. 709/224 |
| 7,512,407 | B2* | 3/2009 | Wu et al. ..................... 455/466 |
| 7,539,724 | B1* | 5/2009 | Callaghan .................... 709/205 |
| 7,543,189 | B2* | 6/2009 | Fichter ................ G06F 11/3688 704/8 |
| 7,680,668 | B2* | 3/2010 | Voruganti ........... G06F 11/3684 704/270.1 |
| 7,707,167 | B2 | 4/2010 | Kishore et al. |
| 7,793,003 | B2* | 9/2010 | Casey et al. ................. 709/249 |
| 7,827,545 | B2* | 11/2010 | Choe et al. .................. 717/168 |

(Continued)

*Primary Examiner* — Tammy Nguyen
(74) *Attorney, Agent, or Firm* — Brian J. Colandreo, Esq.; Jeffrey T. Placker, Esq.; Holland & Knight LLP

(57) ABSTRACT

A method, computer program product, and system for identifying experts is described. An indication of a subject matter area associated with a user is received. A list of experts regarding the subject matter area is determined based upon, at least in part, identifying one or more members included in one or more contact rosters associated with the user. A set of experts, included in the list of experts, that are available for instant messaging communication, is identified. A portion of the list of experts is provided to the user in the context of an instant messaging application associated with the user.

8 Claims, 3 Drawing Sheets

(56) References Cited

U.S. PATENT DOCUMENTS

| | | |
|---|---|---|
| 8,117,549 B2 | 2/2012 | Reiner |
| 8,190,181 B2 * | 5/2012 | Wu et al. .................. 455/466 |
| 8,190,182 B2 * | 5/2012 | Wu et al. .................. 455/466 |
| 8,412,785 B2 * | 4/2013 | Wu et al. .................. 709/206 |
| 8,468,451 B1 | 6/2013 | Rauba |
| 8,560,939 B2 * | 10/2013 | Wu et al. .................. 715/234 |
| 8,566,404 B2 * | 10/2013 | Wu et al. .................. 709/206 |
| 8,693,653 B1 * | 4/2014 | Mullen ................. 379/201.01 |
| 2002/0151321 A1 * | 10/2002 | Winchell et al. ........... 455/519 |
| 2002/0180590 A1 | 12/2002 | Abrams |
| 2004/0039828 A1 | 2/2004 | Coleman et al. |
| 2004/0152477 A1 * | 8/2004 | Wu et al. .................. 455/466 |
| 2004/0177163 A1 * | 9/2004 | Casey et al. ............... 709/249 |
| 2005/0138539 A1 | 6/2005 | Bravery et al. |
| 2005/0261011 A1 * | 11/2005 | Scott ................... G06Q 10/10 455/466 |
| 2006/0271381 A1 * | 11/2006 | Pui .............................. 705/1 |
| 2007/0112924 A1 * | 5/2007 | Ko et al. .................... 709/206 |
| 2007/0198554 A1 | 8/2007 | Liu |
| 2008/0107278 A1 | 5/2008 | Roeck et al. |
| 2008/0238610 A1 * | 10/2008 | Rosenberg ................. 340/5.7 |
| 2008/0263529 A1 * | 10/2008 | Beretta ................ G06F 8/443 717/146 |
| 2009/0015379 A1 * | 1/2009 | Rosenberg ................ 340/10.1 |
| 2009/0112782 A1 * | 4/2009 | Cross et al. ................. 706/45 |
| 2009/0181707 A1 * | 7/2009 | Wu et al. .................. 455/466 |
| 2009/0182808 A1 * | 7/2009 | Wu et al. .................. 709/203 |
| 2009/0187637 A1 * | 7/2009 | Wu et al. .................. 709/206 |
| 2009/0187835 A1 * | 7/2009 | Wu et al. .................. 715/758 |
| 2009/0191905 A1 * | 7/2009 | Wu et al. .................. 455/466 |
| 2010/0262668 A1 * | 10/2010 | Piett ...................... H04W 4/22 709/206 |
| 2010/0299407 A1 * | 11/2010 | Casey et al. ................ 709/219 |
| 2011/0156898 A1 * | 6/2011 | Taillefer et al. ......... 340/539.11 |
| 2011/0208822 A1 * | 8/2011 | Rathod ..................... 709/206 |
| 2011/0276396 A1 * | 11/2011 | Rathod ................... 705/14.49 |
| 2012/0023165 A1 * | 1/2012 | Li ............................. 709/203 |
| 2012/0102050 A1 | 4/2012 | Button et al. |
| 2012/0166970 A1 * | 6/2012 | Gastaldi et al. ............. 715/753 |
| 2013/0159203 A1 * | 6/2013 | Munzer et al. ............. 705/321 |
| 2013/0173532 A1 * | 7/2013 | Xie ............................ 707/608 |
| 2013/0267250 A1 * | 10/2013 | Lin et al. .................. 455/456.3 |
| 2014/0012935 A1 * | 1/2014 | Wu et al. .................. 709/206 |
| 2014/0074629 A1 * | 3/2014 | Rathod ..................... 705/14.73 |
| 2014/0129942 A1 * | 5/2014 | Rathod ..................... 715/720 |
| 2014/0171046 A1 * | 6/2014 | Mullen ..................... 455/415 |
| 2014/0351347 A1 * | 11/2014 | Arroyo et al. .............. 709/206 |
| 2015/0033141 A1 * | 1/2015 | Mishra ...................... 715/752 |
| 2015/0121523 A1 * | 4/2015 | Crowley ............. H04L 63/1441 726/23 |

\* cited by examiner

EXPERT AVAILABILITY IDENTIFICATION

RELATED APPLICATIONS

The subject application is a continuation application of U.S. patent application with Ser. No. 13/707,960, filed on Dec. 7, 2012, the entire content of which is herein incorporated by reference.

TECHNICAL FIELD

This disclosure relates to identifying experts.

BACKGROUND

In various situations, individuals and/or groups may desire assistance from other individuals and/or groups who may have some degree of expertise with regard to one or more aspects of various projects. In certain instances, instant messaging may be a useful media over which to communicate with such experts. Instant messaging may be possible between individuals and/or groups that reside in the same general location (e.g., a single corporate office) and/or individuals and/or groups that reside in different locations and/or form part of different IM communities. In certain instances various experts may be available for communication (e.g., through an instant messaging program) through multi-instance, multi-tenancy, and other communication architectures.

BRIEF SUMMARY OF THE DISCLOSURE

According to one aspect of the disclosure, a computer-implemented method includes receiving, by one or more computing devices, an indication of a subject matter area associated with a user. The method includes determining, by the one or more computing devices, a list of experts regarding the subject matter area based upon, at least in part, identifying one or more experts included in one or more contact rosters associated with the user. The method includes identifying, by the one or more computing devices, a set of experts, included in the list of experts, that are available for instant messaging communication. The method includes providing, by the one or more computing devices, a portion of the list of experts to the user in the context of an instant messaging application associated with the user.

One or more of the following features may be included. The one or more contact rosters associated with the user may collectively span multiple instant messaging communities. The method may include determining the list of experts based upon, at least in part, semantic analysis of one or more previous interactions between the user and one or more potential members of the list. Providing the list of experts to the user may include providing one or more representations of the relative expertise of one or more experts included in the list of experts. The portion of the list provided to the user may include only one or more members of the set of experts that are available for instant messaging communication. Determining the list of experts may be based upon, at least in part, input from the user regarding a scope of search. Providing the portion of the list to the user may include providing a temporary window associated with the instant messaging application. Receiving the indication of the subject matter area may be based upon, at least in part, one or more of the user highlighting a selection of text, the user typing a phrase associated with the subject matter area, and the user dragging and dropping content into an input window.

According to another aspect of the disclosure, a computer program product resides on a computer readable storage medium that has a plurality of instructions stored on it. When executed by a processor, the instructions cause the processor to perform operations including receiving an indication of a subject matter area associated with a user. The operations include determining a list of experts regarding the subject matter area based upon, at least in part, identifying one or more experts included in one or more contact rosters associated with the user. The operations include identifying a set of experts, included in the list of experts, that are available for instant messaging communication. The operations include providing a portion of the list of experts to the user in the context of an instant messaging application associated with the user.

One or more of the following features may be included. The one or more contact rosters associated with the user may collectively span multiple instant messaging communities. The operations may include determining the list of experts based upon, at least in part, semantic analysis of one or more previous interactions between the user and one or more potential members of the list. Providing the list of experts to the user may include providing one or more representations of the relative expertise of one or more experts included in the list of experts. The portion of the list provided to the user may include only one or more members of the set of experts that are available for instant messaging communication. Determining the list of experts may be based upon, at least in part, input from the user regarding a scope of search. Providing the portion of the list to the user may include providing a temporary window associated with the instant messaging application. Receiving the indication of the subject matter area may be based upon, at least in part, one or more of the user highlighting a selection of text, the user typing a phrase associated with the subject matter area, and the user dragging and dropping content into an input window.

According to another aspect of the disclosure, a computing system includes one or more processor devices and one or more memory architectures coupled with the one or more processor devices. The one or more processor devices are configured to receive an indication of a subject matter area associated with a user. The one or more processor devices are configured to determine a list of experts regarding the subject matter area based upon, at least in part, identifying one or more experts included in one or more contact rosters associated with the user. The one or more processor devices are configured to identify a set of experts, included in the list of experts, that are available for instant messaging communication. The one or more processor devices are configured to provide a portion of the list of experts to the user in the context of an instant messaging application associated with the user.

One or more of the following features may be included. The one or more contact rosters associated with the user may collectively span multiple instant messaging communities The one or more processor devices may be configured to determine the list of experts based upon, at least in part, semantic analysis of one or more previous interactions between the user and one or more potential members of the list. Providing the list of experts to the user may include providing one or more representations of the relative expertise of one or more experts included in the list of experts. The portion of the list provided to the user may include only one or more members of the set of experts that are available for instant messaging communication. Determining the list of experts may be based upon, at least in part, input from the user regarding a scope of search. Providing the portion of the list to the user may include providing a temporary window associated with the instant messaging application. Receiving the indication of the subject matter area may be based upon, at least in part, one or more of the user highlighting a selection of text, the user typing a phrase associated with the subject matter area, and the user dragging and dropping content into an input window.

According to one aspect of the disclosure, a computer-implemented method includes receiving, by one or more computing devices, an indication of a subject matter area associated with a user. The method includes determining, by the one or more computing devices, a list of experts regarding the subject matter area based upon, at least in part, identifying one or more experts included in one or more contact rosters associated with the user, wherein the one or more contact rosters collectively span multiple instant messaging communities. The method includes identifying, by the one or more computing devices, a set of experts, included in the list of experts, that are available for instant messaging communication. The method includes providing to the user, by the one or more computing devices, in the context of an instant messaging application associated with the user, the set of experts that are available for instant messaging communication.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE PREFERRED EMBODIMENTS

Figure 1:
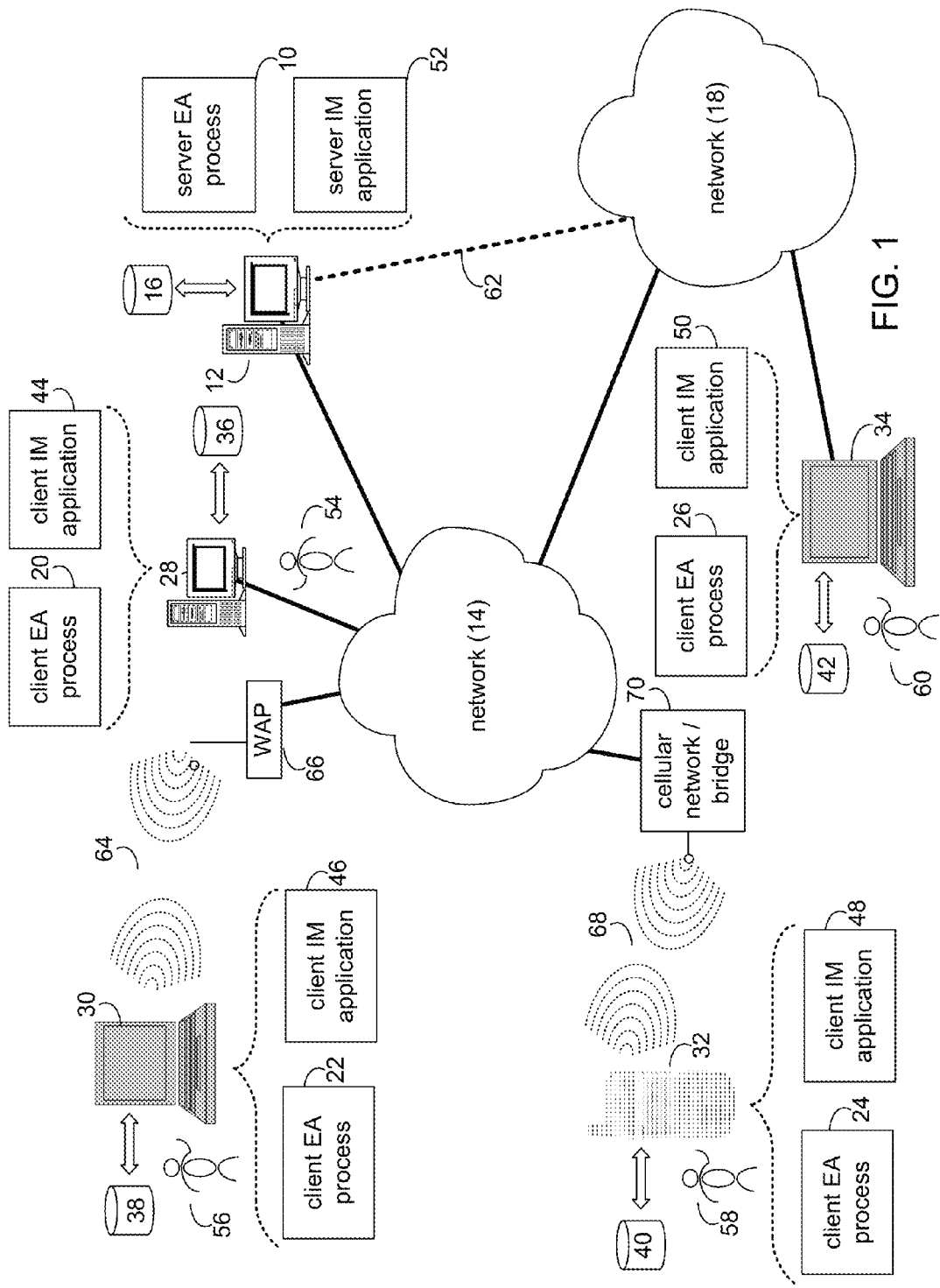
FIG. 1 is a diagrammatic view of a expert availability process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In various personal, professional, and other settings, individuals and groups of individuals may find it useful to receive expert assistance from other individuals and groups of individuals. For example, an individual may be engaged with a particular project and may desire expert assistance from a more experienced co-worker (or other individual) regarding a particular aspect of the project. Individuals may communicate with experts who are not currently in the individuals' location(s) using a variety of electronic means.

In certain embodiments, individuals may communicate with one or more experts (and/or other individuals) using an instant messaging ("IM") application. An IM application may facilitate the exchange of information by way of typed messages that are transmitted from the sender to the recipient on command. IM applications may allow direct text (and/or other) communication between conversation participants and may be integrated with other programs and/or serve as stand-alone applications. For example, certain email applications and/or online email clients may facilitate one user "chatting" (i.e., exchanging instant messages) with other users who are logged on to the program. In certain embodiments, a stand-alone IM application may additionally/alternatively allow users to chat with other individuals who are logged on to the particular service, and/or a cooperating service, associated with the stand-alone application.

In certain embodiments, individuals may maintain lists of contacts for a particular IM application or service. These lists, also sometimes referred to as "buddy lists," may, in certain embodiments, be limited to a single IM application or service. For example, an individual may have a buddy list particular to his work email application, a separate buddy list particular to an online email service, and another buddy list particular to a stand-alone IM application. (It will be understood that these and other buddy lists may include distinct membership or may include overlapping membership.)

In certain embodiments, a "proxy" or "gateway" IM application (which may, for example, be a stand-alone application or part of another application such as an email application) may facilitate an individual communicating with members of multiple IM communities (e.g., members available via various non-gateway IM applications, members associated with a particular connection realm such as a corporate intranet, and so on). For example, a gateway IM application may be configured to understand protocols associated with a variety of IM applications (and/or IM servers), which may be associated with a variety of IM communities. As such, in certain embodiments, by utilizing a gateway IM application, an individual may be able to communicate over IM (and/or utilize other IM application functionality) with other users associated with the individual's email application, a standalone IM application, an online email service IM, and so on even though such users may belong, respectively, to various different IM communities.

In certain embodiments, individuals using IM applications may experience a need for expert assistance. It may be useful to provide an individual using an IM application (e.g., a gateway IM application) with information regarding the availability of experts that may be relevant to the individual's current need for expertise. In certain embodiments, it may be useful to provide availability information regarding experts that may be available for IM communication using a variety of IM applications, and/or who may be available through a variety of channels or connections. For example, although an IM application may provide availability indicators (also sometimes referred to as "status" indicators) with regard to individuals belonging to a particular buddy list, this may not provide information regarding the availability of experts belonging to other buddy lists (or not belonging to any buddy list at all). For example, in a multi-tenancy system (e.g., systems facilitated by cloud services, software-as-a-service ("SAAS") systems, and so on), various experts may be available to assist a particular individual, but the individual may not be aware of these experts because they are not part of the individuals primary tenancy (e.g., the individual's corporate tenancy), because they are not included in the individual's buddy list for the IM application the individual is currently operating, and so on. In some embodiments, an expert availability ("EA") process may address these and other issues.

Referring now to FIG. 1, an EA process may be coupled to a computer or computer network. For example, server EA process 10 may reside on and may be executed by server computer 12, which may be connected to network 14 (e.g., the Internet or a local area network). Examples of server computer 12 may include, but are not limited to: a personal computer, a server computer, a series of server computers, a mini computer, and/or a mainframe computer. Server computer 12 may be a web server (or a series of servers) running a network operating system, examples of which may include but are not limited to: Microsoft® Windows Server®; Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server EA process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft® IIS, Novell® Web Server™, or Apache® Web Server, that allows for access to server computer 12 (via network 14) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; Apache is a registered trademarks of Apache Software Foundation in the United States, other countries, or both; Lotus and Sametime are registered trademarks of International Business Machine Corp. in the United States, other countries, or both.) Network 14 may be connected to one or more secondary networks (e.g., network 18), examples of which may include but are not limited to: a local area network; a wide area network; or an intranet, for example.

Client EA processes 20, 22, 24, 26 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 14 and/or network 18 and may each execute an operating system, examples of which may include but are not limited to Microsoft® Windows®, Microsoft Windows CE®, Red Hat® Linux®, or a custom operating system.

The instruction sets and subroutines of client EA processes 20, 22, 24, 26, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

In an embodiment, the EA process may be a server-side process (e.g., which may be implemented via server EA process 10), in which all of the functionality of the EA process may be executed on a server computer (e.g., server computer 12). In an embodiment, the EA process may be a client-side process (e.g., which may be implemented via one or more of client EA processes 20, 22, 24, 26), in which all of the functionality of the EA process may be executed on a client computing device (e.g., one or more of client electronic devices 28, 30, 32, 34). In an embodiment, the EA process may be a hybrid server-client process (e.g., which may be implemented by server EA process 10 and one or more of client EA processes 20, 22, 24, 26), in which at least a portion of the functionality of the EA process may be implemented via server computer 12 and at least a portion of the functionality of the EA process may be implemented via one or more client computing devices (e.g., one or more of client electronic devices 28, 30, 32, 34).

In certain embodiments, an EA process may be a stand-alone process. In certain embodiments, an EA process may operate as part of, or in conjunction with, one or more other processes and/or may include one or more other processes. For example, in certain embodiments, an EA process may be included in (or may operate in conjunction with) an IM application (or process) and/or another application for conferencing, communication, or other types of collaboration.

An IM application (or process) may operate (and/or reside) on a client device (e.g., client IM application 44, operating on client electronic device 28; client application IM 46, operating on client electronic device 30; client IM application 48, operating on client electronic device 32; or client IM application 50, operating on client electronic device 34). A client EA process (e.g., client EA process 20) or a server EA process (e.g., server EA process 10) may be in communication with a client IM application (e.g., client IM application 44) or may be part of a client IM application.

An IM application may additionally/alternatively operate (and/or reside) on a server device (e.g., server IM application 52, operating on server computer 12 or another server IM application (not shown), operating on another server computer (not shown)). A server EA process (e.g., server EA process 10) or a client EA process (e.g., client EA process 20) may be in communication with a server IM application (e.g., server IM application 52) or may be a part of a server IM application.

As also noted above, an IM application (or process) may facilitate the exchange of information by way of typed messages that are transmitted from the sender to the recipient on command. IM applications (or processes) may allow direct text (and/or other) communication between conversation participants and may be integrated with other programs or may serve as stand-alone applications.

In certain embodiments an IM application (e.g., server IM application 52) may be a gateway IM application. As such, for example, in certain embodiments an IM application (e.g., server IM application 52) may be configured to interface with one or more other IM applications (and/or other IM servers). For example, a gateway IM application may be configured to facilitate communication and/or other IM functionality for and between individuals belonging to different IM communities by way of a configuration document or configuration settings that specify certain protocols of various other IM applications (and/or other IM servers). As such, for example, a user may utilize a gateway IM application to contact and/or otherwise engage in IM functionality with (e.g., adding an individual to a buddy list, and so on) individuals belonging to one or more different IM communities than the user. Similarly, such individuals belonging to different IM communities may, in certain embodiments, utilize such a gateway IM application to contact and/or otherwise engage in IM functionality with the user.

Users 54, 56, 58, 60 may access an EA process in various ways. For example, these users may access server EA process 10 directly through the device on which a client process (e.g., client EA processes 20, 22, 24, 26) is executed, namely client electronic devices 28, 30, 32, 34. Users 54, 56, 58, 60 may access server EA process 10 directly through network 14 and/or through secondary network 18. Further, server computer 12 (i.e., the computer that executes server EA process 10) may be connected to network 14 through secondary network 18, as illustrated with phantom link line 62. Users 54, 56, 58, 60 may also access a client or server IM application in similar ways.

The various client electronic devices may be directly or indirectly coupled to network 14 (or network 18). For example, personal computer 28 is shown directly coupled to network 14 via a hardwired network connection. Further, notebook computer 34 is shown directly coupled to secondary network 18 via a hardwired network connection. Laptop computer 30 is shown wirelessly coupled to network 14 via wireless communication channel 64 established between laptop computer 30 and wireless access point ("WAP") 66, which is shown directly coupled to network 14. WAP 66 may be, for example, an IEEE 802.11a, 802.11b, 802.11g, 802.11n, Wi-Fi, and/or Bluetooth device that is capable of establishing wireless communication channel 64 between laptop computer 30 and WAP 66. Data-enabled mobile telephone 32 is shown wirelessly coupled to network 14 via wireless communication channel 68 established between data-enabled mobile telephone 32 and cellular network/bridge 70, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client EA process 20 will be described for illustrative purposes. It will be understood that client EA process 20 may, for example, interact and/or communicate with a server EA process such as server EA process 10 and/or may be executed within one or more applications that allow for communication with other server and/or client EA processes. This is not intended to be a limitation of this disclosure, as other configurations are possible (e.g., EA process 20 may include stand-alone client processes and/or stand-alone server processes). For example, some implementations may include one or more of client EA processes 22, 24, 26 or server EA process 10 in place of or in addition to client EA process 20.

Figure 2:
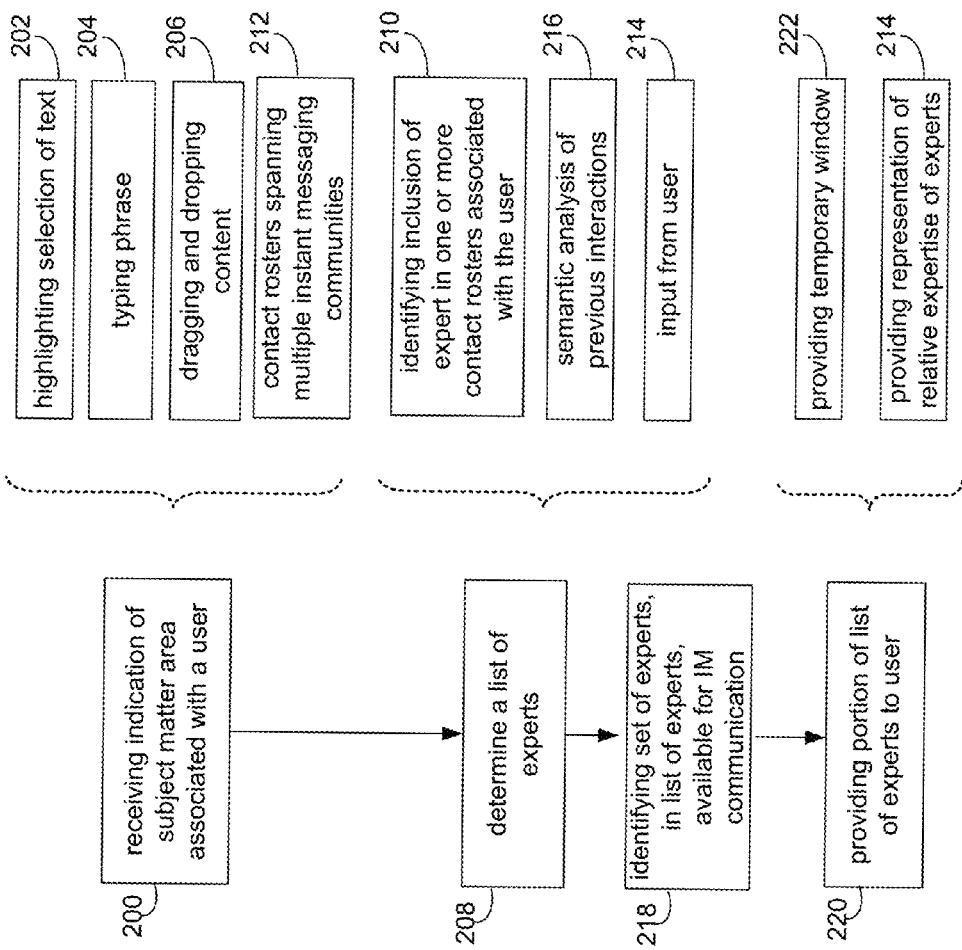
FIG. 2 is a flowchart of a process executed by the expert availability process of FIG. 1.

Referring now also to FIG. 2, there is shown a diagrammatic view of an example process that may be implemented by an EA process, e.g., client EA process 20. Client EA process 20 may receive 200 an indication of a subject matter area associated with a user. For example, a user may be engaged with a project and may determine that she needs assistance regarding a particular topic, problem, plan, and so on for the project. The user may accordingly be in need of assistance from another individual with knowledge and/or experience relevant to the particular topic, problem, plan, and so on—i.e., a subject matter area expert. As such, the user may indicate that she is in need of assistance with regard to the particular subject matter area.

EA process 20 may receive 200 an indication of a subject matter area in a variety of ways. For example, in certain embodiments, EA process 20 may receive 200 such an indication based upon the user highlighting 202 a selection of text (and/or other content) in a separate window or application. As used herein, "highlighting" may refer to a specialized selection (e.g., a selection of content with a special selection tool associated with EA process 20) and/or a more generalized selection (e.g., a selection of content in a variety known ways such as selecting lines of text with a mouse). For example, a user may indicate to EA process 20 that she needs assistance regarding a particular subject matter area by using a mouse input device to select from a wiki, a blog, a web page, an email, an IM conversation, a document or other file, and so on text (and/or other content) relating to such subject matter area.

In certain embodiments, EA process 20 may automatically determine the subject matter area based upon the highlighted 202 selection. For example, a user may indicate through a user interface (e.g., via an application menu, a pop-up menu, system configuration, or other suitable user interface) that she intends to select content regarding which she needs assistance. As such, EA process may automatically receive 200 an indication based on the user highlighting 202 the selection and may analyze the semantics (and/or other) characteristics of the highlighted 202 selection in order to determine the particular subject matter area (and/or determine the subject matter area of the highlighted 202 text in a variety of known ways).

In certain embodiments, EA process 20 may receive 200 an indication of subject matter based upon the user highlighting 202 a selection of text and subsequently indicating to EA process 20 that she needs assistance regarding the highlighted content. For example, a user may highlight certain content in a blog, wiki, web page, and so on, then may indicate (e.g., through a pop-up menu or other suitable user interface) that she needs assistance regarding the highlighted 202 selection.

In certain embodiments, EA process 20 may receive 200 an indication of a subject matter area based upon the user typing 204 a phrase associated with the subject matter area. For example, in certain embodiments, a user may type 204 a phrase into an IM application (and/or other input interface) and may then indicate (e.g., through a suitable user interface) that she requires assistance regarding the subject matter area of the typed 204 phrase. EA process 10 may accordingly analyze the semantics (and/or other) characteristics of the typed 204 phrase in order to determine the particular subject matter area. In certain embodiments a user may provide an indication of subject matter area by typing 204 a phrase into an input window associated with EA process 20 (i.e., in addition/as an alternative to a window associated with a related IM communication and/or IM application).

In certain embodiments, EA process 20 may receive 200 an indication of a subject matter area based upon the user dragging and dropping 206 content into an input window. For example, a user may select particular content (e.g., a portion of text, an image, a video, and so on) and may "drag and drop" that content into an appropriate window (e.g., using a suitable input device, such as a mouse, a touchscreen, and so on) in order to provide an indication of a subject matter area. For example, a user may drag and drop content into a window of an IM application, an input window of EA process 20, and so on, in order to provide an indication of a subject matter area.

EA process 20 may determine 208 a list of experts regarding the subject matter area. EA process 20 may determine 208 a list of subject matter experts in a variety of ways. EA process 20 may, for example, determine 208 a list of individuals who have been designated as experts regarding the subject matter area in a directory or other repository, who have designated themselves as experts regarding the subject matter area, who have previously provided subject matter expertise on the same (and/or related) subject matter areas, and so on.

In certain embodiments, EA process 20 may determine 208 the list of experts based upon identifying 210 the inclusion of one or more experts in one or more contact rosters associated with the user. A contact roster may be a buddy list associated with an IM application or a list of contacts associated with another communication application or repository associated with the user (e.g., a corporate directory, an industry expert list, a list of clients of a SAAS or other cloud-based tenancy, another roster of contacts associated with an organization, company, or entity with which the user is associated, and so on). In certain embodiments, a contact roster may be a buddy list (and/or a contact list) associated a gateway IM application (and thereby, in some embodiments, a combination of buddy lists associated with various separate IM applications). In this way, for example, EA process 20 may facilitate identifying the availability of experts distributed across cloud computing, multi-tenancy, cross-tenancy, and other architectures and/or contact realms.

In certain embodiments, for example, an individual included on a contact roster may not be included on a particular buddy list associated with the user needing expert assistance. For example, certain buddy lists of a particular user may represent only a subset of individuals for whom the user has contact information and/or only a subset of individuals the contact information of whom an IM application associated with the certain buddy lists has access to. For example, an individual may chose to populate a particular buddy list (e.g., the buddy list always present when the individual is signed on to a workplace IM application) only with those other individuals with whom the individual frequently communicates, is close friends with, is on a project team with, and so on. As such, for example, various potential experts may be included within a contact roster (e.g., a corporate directory, cloud computing directory, and so on) associated with the work email application of a particular individual (e.g., through the linking of the email application's contact roster with the corporate directory, cloud computing directory, and so on) but may not be included on a currently active (and/or other) buddy list associated with a particular IM (and/or other) application. As such, the individual may not be aware that certain potential experts (e.g., those not included in the current buddy list) are available to assist the user. In certain embodiments, therefore, EA process 20 may identify 210 that these potential experts are part of a contact roster associated with the individual (i.e., the contact roster associated with the individual's work email system as a whole) even though these potential experts are not explicitly part of one or more of the individual's buddy lists (e.g., the active buddy list for the IM application associated with the individual's work email). In this way, for example, EA process 20 may facilitate identifying the availability of experts who may not be known to the user needing assistance and/or who may not otherwise occur to the user as potential experts (e.g., because not included in an active or other buddy list).

Continuing the above example, in certain embodiments, a potential expert may have indicated (e.g., through a user input or preference) that he is (or may be determined to be) available to provide expertise regarding various subject matter areas. However, if that expert is not part of a particular buddy list for the user needing assistance, the user may not be aware that the expert is available to provide assistance. EA process 20, accordingly, in certain embodiments, may identify 210 that such an expert is part of a contact roster associated with the individual (e.g., because the expert is part of a directory with which the user is associated, because the expert has made his contact information publicly available to other users operating on the same multi-tenancy architecture, and so on) and may accordingly determine 208 the list of potential available experts to include this identified 210 potential expert even though this potential expert may not be part of a current (and/or other) buddy list associated with the user needing assistance.

As also noted above, in certain embodiments, the one or more contact rosters may collectively span 212 multiple instant messaging communities. An instant messaging community may be a particular grouping, collection, amalgamation, or other association of instant messaging contacts, such as a community within a particular domain (e.g., a community connected by a corporate intranet or corporate IM application), a community connected through a particular application or service (e.g., a particular cloud computing service, or a particular email or IM application), and so on. For example, an instant messaging community for a user may include a community of those contacts that are available for connection using an IM application associated with a work email, those contacts available for connection through a particular stand-alone IM application, those contacts available for connection through an online IM service, and so on. An instant messaging community may include those contacts that are associated with a user's professional computing activities (e.g., contacts included in a corporate buddy list or corporate directory). An instant messaging community may include those contacts that are associated with a particular society (e.g., a professional society) or other group (e.g., a social networking group) to which the user is a member.

In instances of cloud-based tenancy (e.g., a multi-tenancy architecture), for example, an instant messaging community may include those contacts that are available for communication over the cloud (e.g., others also utilizing the multi-tenancy architecture, including, potentially, individuals forming part of a different tenancy than the user needing assistance). As such, for example, EA process 20 may determine 208 a list of potential experts including experts from a first contact roster associated with a first instant messaging community (e.g., an active buddy list), a second contact roster associated with a second instant messaging community (e.g., a community found in an internal corporate directory), a third contact roster associated with a third and fourth instant messaging community (e.g., through an external corporate directory and an external buddy list), and so on. In this way, for example, EA process 20 may determine 208 a list of potential experts including experts that may be available via various instant messaging communities and may thereby increase the range of potential (and/or available) experts that may be suitable for a particular user and a particular subject matter area.

In certain embodiments, the one or more contact rosters spanning 212 multiple IM communities may form part of a collection of contact rosters, which may be reflected in a master (and/or other) contact list associated with a gateway (or proxy) IM application. In other words, in certain embodiments EA process 20 may determine 208 a list of experts based upon, at least in part, a set of individuals who may respectively belong to different contact rosters and/or instant messaging communities, but who may each be accessible to a particular user (i.e., the user in need of expert assistance) through one or more gateway IM applications. For example, a gateway IM application may facilitate a user communicating, through a single (or unified) instant messaging interface, with other individuals who are included, respectively, in a corporate IM application roster, a web-based personal IM application roster, a cloud-based contact roster, and so on, even though such contact rosters may be respectively associated with different non-gateway IM applications and/or the various individuals included on such rosters may belong to different IM communities. As such, for example, EA process 20 may determine 208 a list of experts based upon identifying 210 the inclusion of one or more experts in one or more contact rosters associated with the user, wherein some (or all) of those contact rosters may be accessible through a gateway IM application.

In certain embodiments, determining 208 the list of experts may be based upon, at least in part, input 214 from a user. For example, in certain embodiments, a user may provide an input to EA process 20 (e.g., via setting a preference in an IM application) regarding the scope of the search for available experts. For example, a user may provide an input to EA process 20 regarding the scope of contacts (and/or contact types) that may be included in the list of experts, thereby restricting (and/or expanding) the scope of the search for available experts. For example, a user may indicate limits on the degree of expertise (e.g., that EA process 20 should determine 208 a list including only individuals that have a high degree of expertise in the relevant subject matter area), the instant messaging communities from which the experts may be drawn (e.g., that EA process 20 should determine 208 a list including only individuals that are available for connection over a corporate intranet, a shared multi-tenancy architecture, and a particular buddy list), the location of the experts (e.g., that EA process 20 should determine 208 a list including only individuals that are located within 5 miles of the user, within the user's time zone, or within the user's country), and so on.

In certain embodiments, determining 208 the list of experts may be based upon, at least in part, semantic analysis 216 of one or more previous interactions between a user and one or more potential members of the list of experts. For example, it may be useful to determine 208 a list of potential experts who have previously collaborated with the user in need of assistance regarding a particular subject matter area. As such, in certain embodiments EA process 20 may analyze 216 semantic characteristics of previous interactions between a user and a potential member of the list of experts (e.g., a previous IM communication, a previous email chain, and so on) in order to identify instances in which a particular potential member of the list of experts interacted with the user in need of assistance regarding a particular subject matter area. For example, in certain embodiments EA process 20 may analyze 216 semantic characteristics of previous interactions in order to identify potential experts who have previously assisted the user in need of assistance regarding the subject matter regarding which the user needs assistance, and may determine 208 the list of potential experts to include such identified previous collaborators. In certain embodiments, EA process 20 may additionally/alternatively analyze the quality of previously-rendered expert assistance as part of determining 208 the list of experts, based, for example, on semantic analysis 216 of previous collaborations.

EA process 20 may identify 218 a set of experts, included in the determined 208 list of experts, that are available for instant messaging communication. For example, using status (and/or other) information associated with a potential expert, EA process may identify 218 that a certain potential expert is (or is not) available to communicate with the user needing assistance over an IM application (and/or over other communication channels). In certain embodiments, the list of experts may be determined 208 to include only experts that are available for instant messaging communication. For example, EA process 20 may identify 218 experts that are available for IM communication and may determine 208 the list of experts to include only such identified 218 available experts. In certain embodiments, the identified 218 set of available experts may include experts who are currently available for instant messaging communication. In certain embodiments, the identified 218 set of experts may include experts who are expected to be available for instant messaging communication during a certain future period. For example, EA process 20 may analyze calendar (and/or other) information associated with a particular potential expert in order to determine whether that potential expert is likely to be available for IM communication in the next half hour, the next half day, and so on, and may (or may not) accordingly identify 218 such expert as part of the set of experts available for IM communication.

EA process 20 may provide 220 a portion of the list of experts to the user. In certain embodiments, EA process 20 may provide 220 a portion of the list of determined 208 experts in the context of an IM application associated with the user. For example, EA process 20 may highlight determined 208 experts within a currently active buddy list associated with the user needing expert assistance in order to indicate to the user that such individuals represent potential expert assistance for the user regarding the instant subject matter area. In certain embodiments, EA process 20 may provide 220 the portion of the list by providing 222 a temporary window associated with an IM (and/or other) application. For example, EA process 20 may cause a temporary window to open (e.g. in the context of an IM application) that displays to the user a portion of the determined 218 list of experts.

In certain embodiments, EA process 20 may provide 220 to the user only the identified 218 set of experts that are available for instant messaging communication. For example, in certain embodiments, EA process 20 may provide 220 the identified 218 set of experts through an IM application associated with the user. For example, EA process 20 may highlight identified 218 experts within a current buddy list associated with the user needing expert assistance in order to indicate to the user that such individuals represent available potential expert assistance for the user regarding the instant subject matter area. In certain embodiments, EA process 20 may provide 220 the identified 218 set of experts by providing 222 a temporary window associated with an IM (and/or other) application. For example, EA process 20 may cause a temporary window to open (e.g. in the context of an IM application) that displays to the user a portion of the identified 218 set of experts.

In certain embodiments, EA process 20 may provide 224 one or more representations of the relative expertise of one or more experts in the list of experts. For example, in a buddy list of an IM application and/or a provided 222 temporary window EA process 20 may indicate the relative expertise of the various experts in the determined 218 list (and/or identified 218 set) of experts by color coding relative expertise, by providing a numerical indicator of relative expertise, by animating various icons associated with various experts, and so on.

Figure 3:
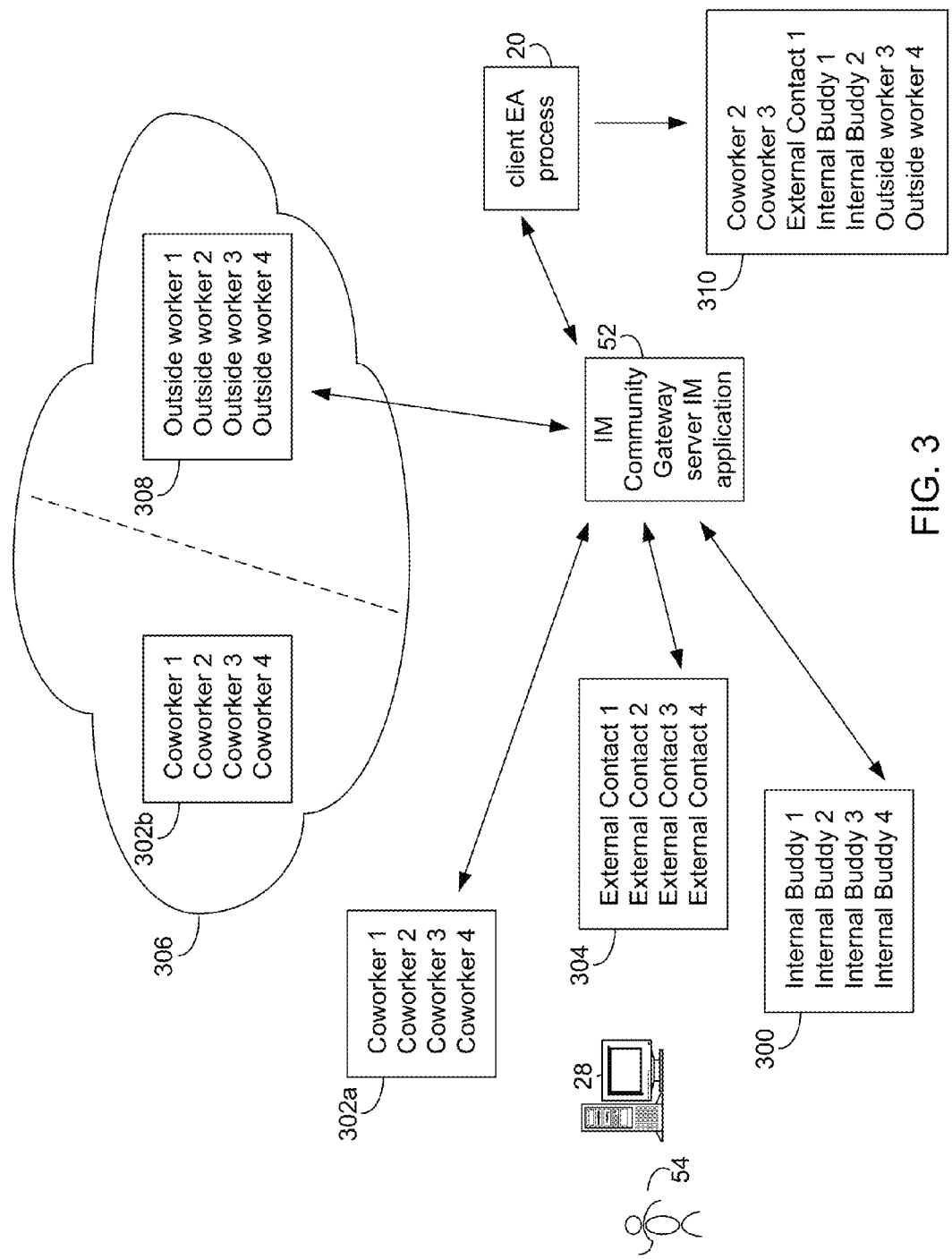
FIG. 3 is a diagrammatic view of an implementation of the expert availability process of FIG. 1.

Referring now also to FIG. 3, user 54 (using, e.g., computing device 28) may be engaged with a project for which she needs expert assistance. User 54 may be using active buddy list 300, which may include a number of contacts but may be limited to contacts within user 54's corporate organization/community. User 54 may also have access to corporate directory 302a and list of contacts 304 of individuals outside user 54's corporate organization/community (e.g., a outside buddy list, or outside directory, and so on). User 54 may be engaged with various applications provided through a multi-tenancy service operating on cloud 306 and, accordingly, corporate directory 302a may be mirrored by corporate directory 302b available through multi-tenancy cloud hosting architecture 306. A different organization may also be engaged with applications provided through cloud hosting architecture 306 and, accordingly, corporate directory 308 for this different organization (and/or another record of contact information for workers in that organization) may also be available via cloud 306. Further, certain individuals in the different organization may have indicated (e.g., by changing a user setting associated with corporate directory 308) that they are available to provide expert assistance outside of the different organization. As such, for example, EA process 20 may determine 208 a list of potential experts based on a broad pool of potential experts (i.e., a pool that may span multiple IM communities and may therefore extend beyond potential experts associated with user 54's corporate organization and beyond potential experts that may even be personally known to user 54). For example, EA process 20 may determine 208 list of potential experts 310 to assist user 54 based on individuals identified not only in active buddy list 300, but also corporate directory 302*a* (and/or 302*b*), list of contacts 304, and corporate directory 308.

In certain embodiments, as also noted above, a user may utilize a instant messaging gateway to facilitate online communication with, for example, individuals belonging to various different IM communities. (As noted above, a gateway—or proxy—IM application may facilitate an individual communicating with members of many separate contact rosters and/or IM communities.) In certain embodiments, for example, user 54 may utilize an IM gateway (e.g., IM community gateway server IM application 52) to facilitate instant messaging communication with other individuals, even though those individuals may be included in a variety of different IM communities. For example, user 54 may utilize gateway server IM application 52 to communicate with individuals included in corporate directory 302*a*, list of contacts 304, and active buddy list 300, even though these lists may represent sets of individuals belonging to different IM communities. As such, for example, in certain embodiments client EA process 20 (which may, as also noted above, in certain embodiments, be part of and/or operate in conjunction with a gateway and/or other IM application), may determine 208 list of potential experts 310 that may include individuals belonging to different IM communities, wherein such individuals belonging to different IM communities may be accessible to a user through a gateway IM application (e.g., gateway server IM application 52). For example, EA process 20 may access contact rosters (and/or other information) associated with various IM communities via a gateway IM application (e.g., gateway server IM application 52) in order to determine 208 an amalgamated list of available experts spanning the various communities (i.e., list 310). In certain embodiments, EA process 20 may provide 220 such list 310 to a user (e.g., user 54) through and/or in the context of such a gateway application (e.g., gateway server IM application 52) and/or another IM application (e.g., client IM application 44).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. A computer-implemented method comprising:
   receiving, by one or more computing devices, an indication of a subject matter area associated with a request for assistance by a user;
   determining, by the one or more computing devices, a list of experts regarding the subject matter area based upon, at least in part, identifying one or more experts included in one or more contact rosters associated with the user, wherein the list of experts includes a list of individuals specializing in the subject matter area;
   identifying, by the one or more computing devices, a set of experts, included in the list of experts, that are available for instant messaging communication; and
   providing, by the one or more computing devices, a portion of the list of experts to the user in the context of an instant messaging application associated with the user, wherein determining the list of experts is based upon, at least in part, a semantic analysis of one or more previous interactions between the user and one or more potential members of the list of experts regarding the subject matter area, wherein the semantic analysis of the one or more previous interactions between the user and the one or more potential members of the list of experts includes the semantic analysis of at least one of a previous instant messaging communication between the user and the one or more potential members of the list of experts identifying the subject matter area, and a previous email between the user and the one or more potential members of the list of experts identifying the subject matter area.

2. The computer-implemented method of claim 1 wherein the one or more contact rosters associated with the user collectively span multiple instant messaging communities.

3. The computer-implemented method of claim 1 wherein providing the list of experts to the user includes providing one or more representations of the relative expertise of one or more experts included in the list of experts.

4. The computer-implemented method of claim 1 wherein the portion of the list provided to the user includes only one or more members of the set of experts that are available for instant messaging communication.

5. The computer-implemented method of claim 1 wherein determining the list of experts is based upon, at least in part, input from the user regarding a scope of search.

6. The computer-implemented method of claim 1 wherein providing the portion of the list to the user includes providing a temporary window associated with the instant messaging application.

7. The computer-implemented method of claim 1 wherein receiving the indication of the subject matter area is based upon, at least in part, one or more of the user highlighting a selection of text, the user typing a phrase associated with the subject matter area, and the user dragging and dropping content into an input window.

8. A computer-implemented method comprising:
   receiving, by one or more computing devices, an indication of a subject matter area associated with a request for assistance by a user;
   determining, by the one or more computing devices, a list of experts regarding the subject matter area based upon, at least in part, identifying one or more experts included in one or more contact rosters associated with the user, wherein the one or more contact rosters collectively span multiple instant messaging communities, wherein the list of experts includes a list of individuals specializing in the subject matter area;
   identifying, by the one or more computing devices, a set of experts, included in the list of experts, that are available for instant messaging communication; and
   providing to the user, by the one or more computing devices, in the context of an instant messaging application associated with the user, the set of experts that are available for instant messaging communication, wherein determining the list of experts is based upon, at least in part, a semantic analysis of one or more previous interactions between the user and one or more potential members of the list of experts regarding the subject matter area, wherein the semantic analysis of the one or more previous interactions between the user and the one or more potential members of the list of experts includes the semantic analysis of at least one of a previous instant messaging communication between the user and the one or more potential members of the list of experts identifying the subject matter area, and a previous email between the user and the one or more potential members of the list of experts identifying the subject matter area.

* * * * *